United States Patent
Assaleh et al.

(10) Patent No.: US 6,556,969 B1
(45) Date of Patent: Apr. 29, 2003

(54) LOW COMPLEXITY SPEAKER VERIFICATION USING SIMPLIFIED HIDDEN MARKOV MODELS WITH UNIVERSAL COHORT MODELS AND AUTOMATIC SCORE THRESHOLDING

(75) Inventors: Khaled Assaleh, Mission Viejo, CA (US); Ayman Asadi, Laguna Niguel, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/408,453

(22) Filed: Sep. 30, 1999

(51) Int. Cl.[7] ............... G10L 15/06; G10L 15/14
(52) U.S. Cl. ............... 704/256; 704/243; 704/245
(58) Field of Search .................... 704/246, 257, 704/223, 230, 256, 243, 245, 250

(56) References Cited

U.S. PATENT DOCUMENTS

| | | | |
|---|---|---|---|
| 5,465,317 A | * 11/1995 | Epstein ............... | 704/256 |
| 5,644,680 A | * 7/1997 | Bielby et al. ............... | 704/256 |
| 5,675,704 A | * 10/1997 | Juang et al. ............... | 704/250 |
| 5,895,447 A | * 4/1999 | Ittycheriah et al. ......... | 704/246 |
| 5,995,927 A | * 11/1999 | Li ............... | 704/233 |
| 6,029,124 A | * 2/2000 | Gillick et al. ............... | 704/231 |
| 6,076,055 A | * 6/2000 | Bossemeyer, Jr. et al. .. | 704/250 |
| 6,081,660 A | * 6/2000 | MacLeod et al. ........... | 704/255 |
| 6,141,644 A | * 10/2000 | Kuhn et al. ............... | 704/230 |
| 6,161,090 A | * 12/2000 | Kanevsky et al. .......... | 704/246 |
| 6,233,557 B1 | * 5/2001 | Poppert ............... | 704/250 |

FOREIGN PATENT DOCUMENTS

WO     96/17341     12/1995

OTHER PUBLICATIONS

Khaled T. Assahle and Richard J. Mammone, "Robust Cepstral Features for Speaker Identification" Center for Computer Aids Industrial Productivity, Rutgers University, 1994 IEEE, (pp. I-129-I-132).

* cited by examiner

*Primary Examiner*—Doris H. To
*Assistant Examiner*—Daniel A. Nolan
(74) *Attorney, Agent, or Firm*—Farjami & Farjami LLP (57) ABSTRACT

A low complexity speaker verification system that employs universal cohort models an automatic score thresholding. The universal cohort models are generated using a simplified cohort model generating scheme. In certain embodiments of the invention, a simplified hidden Markov modeling (HMM) scheme is used to generate the cohort models. In addition, the low complexity speaker verification system is trained by various users of the low complexity speaker verification system. The total number of users of the low complexity speaker verification system may be modified over time as required by the specific application, and the universal cohort models may be updated accordingly to accommodate the new users. The present invention employs a combination of universal cohort modeling and thresholding to ensure high performance. In addition, given the simplified generation of the cohort models and training of the low complexity speaker verification system, substantially reduced processing resources and memory are amenable for high performance of the low complexity speaker verification system. In certain embodiments of the invention, the invention is an integrated speaker training and speaker verification system that performs both training and speaker verification.

12 Claims, 7 Drawing Sheets

LOW COMPLEXITY SPEAKER VERIFICATION USING SIMPLIFIED HIDDEN MARKOV MODELS WITH UNIVERSAL COHORT MODELS AND AUTOMATIC SCORE THRESHOLDING

CROSS REFERENCES TO RELATED APPLICATIONS

The following application is hereby incorporated herein by reference in its entirety and made part of the present application:

1) U.S. patent application Ser. No. 09/410,215, filed Sep. 30,1999, issued as U.S. Pat. No. 6,405,168 on Jun. 11, 2002.

BACKGROUND

1. Technical Field

The present invention relates generally to speaker verification; and, more particularly, it relates to speaker verification employing a combination of universal cohort modeling and automatic score thresholding.

2. Description of Related Art

Conventional systems employing speaker recognition and other automatic speaker verification (ASV) provide a means to ensure secure access to various facilities. The ability to control the flow of personnel to various portions within a facility, without the intervention of man-occupied stations, is also very desirable for many applications. For example, many businesses use card-controlled access or numerical keypads to control the flow of personnel into various portions of a facility. Facility management, when controlling a single building having a number of businesses occupying various portions of the building, often use such means of facility access control to monitor and ensure that various portions of the facility are safe and secure from intruders and other unauthorized personnel. Such personnel recognition system and automatic speaker verification (ASV) systems provide the ability to control the flow of personnel using speech utterances of the personnel. Verbal submission of a predetermined word or phrase or simply a sample of an individual speaker's speaking of a randomly selected word or phrase are provided by a claimant when seeking access to pass through the speaker recognition and other automatic speaker verification (ASV) systems. An authentic claimant is one of the personnel who is authorized to gain access to the facility.

A trend for many of these speaker recognition and other automatic speaker verification (ASV) systems is to employ systems that employ unsupervised training methods to prepare the speaker verification system to operate properly in real time. However, many of the conventional systems require substantial training and processing resources, including memory, to perform adequately. Within such systems, a claimant provides a speech sample or speech utterance that is scored against a model corresponding to the claimant's claimed identity and a claimant score is then computed. There are two commonly known conventional methods known to those having skill in the art of speaker verification to decide whether to accept or reject the claimant; that is to say, whether to permit the claimant to pass through the speaker verification system of to deny the claimant access, i.e., to confirm that the claimant is in fact an authorized member of the personnel of the facility.

A first conventional method to perform speaker verification compares a score that is derived from the claimant provided utterance to a predetermined threshold level. The claimant is subsequently declared to be a true speaker solely upon the determination of whether the claimant's score exceeds the predetermined threshold level. Alternatively, if the claimant's score falls below the predetermined threshold level, the claimant is rejected and denied access through the speaker verification system. Deficiencies in this first conventional method of performing speaker verification are many. Although this first conventional method of performing speaker verification has relatively low computational and storage requirements, it is substantially unreliable. A predominant reason for the unreliability of this first conventional method of performing speaker verification stems from the fact that it is highly biased to the training data, and it is consequently highly biased to the training conditions that existed during its training.

A second conventional method used to perform speaker verification compares the score that is derived from the claimant's utterance to a plurality of scores that are computed during the speaker verification process, i.e., when the claimant claims to be a true speaker or member of the personnel of the facility, namely, an individual speaker authorized to gain access through the speaker identification system. The plurality of scores that are compared to the score that is derived from the claimant provided utterance using the second conventional method to perform speaker verification are generated by scoring the claimant's score against a set of scores extracted from models known cohort speakers. One difficulty, among others, with using the cohort modeling is the required set of cohort models necessitated to perform speaker verification is different for every speaker; consequently, a large amount of processing must be performed to determine the proper cohort model or models for a given claimant. A relatively significant amount of memory is also required to store all of the various cohort models to accommodate all of the speakers of the system. In addition, the method of training the conventional speaker verification system requires access to a relatively large pool of speaker cohort models to select the proper cohort set; the accompanying data storage requirements are typically very large as described above. A problem for speaker verification systems having relatively constrained memory requirements and processing requirements is that their reliability suffers greatly using such conventional methods. Also, the memory management and data processing needs are also great, in that, several cohort scores must be computed for proper verification; these cohort scores are in addition to the claimant's score in the instant case. Conventional speaker verification systems suffer in terms of relatively large memory requirements, an undesirable high complexity, and an unreliability associated with each of the first conventional method and the second conventional method to perform speaker verification.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in an integrated speaker training and speaker verification system that generates a speaker model and a speaker authenticity using a speech utterance provided by a claimant. The integrated speaker training and speaker verification system contains a training circuitry, a memory, a pattern classification circuitry, and a decision logic circuitry. The training circuitry generates the speaker model and a speaker threshold using the speech utterance provided by the claimant. The memory stores the speaker model and the speaker threshold corresponding to the speech utterance provided by the claimant. The memory also stores a number of cohort models. The pattern classification circuitry processes the speech utterance provided by the claimant. The speech utterance is scored against a selected cohort model chosen from the number of cohort models and the speaker model. The decision logic circuitry processes the speech utterance provided by the claimant, and the speech utterance is scored against the speaker threshold. The pattern classification circuitry and the decision logic circuitry operate cooperatively to generate a speaker authenticity.

In certain embodiments of the invention, the integrated speaker training and speaker verification system contains an offline cohort model generation circuitry that generates three cohort models. One of the cohort models is generated using speech utterances of male speakers. Another of the cohort models is generated using speech utterances of female speakers. A third of the cohort models is generated using speech utterances of both male and female speakers. The pattern classification circuitry of the integrated speaker training and speaker verification system is any unsupervised classifier. In certain embodiments of the invention, the integrated speaker training and speaker verification system contains a switching circuitry that selects between a training operation and a testing operation. The speech utterance provided by the claimant corresponds to a claimed identity of a user authorized to gain entry through the testing operation of the integrated speaker training and speaker verification system. The decision logic circuitry compares the speaker threshold to a relative score that is calculates during the testing operation of the integrated speaker training and speaker verification system, and the relative score itself is generated using the speech utterance provided by the claimant. The integrated speaker training and speaker verification system contains a pre-processing and feature extraction circuitry wherein the pre-processing and feature extraction circuitry removes silence and extracts a plurality of cepstral features of the speech utterance provided by the claimant. If desired, the speech utterance provided within the integrated speaker training and speaker verification system is a predetermined verification phrase.

Other aspects of the invention can be found in a speaker verification system that generates a speaker authenticity using a speech utterance provided by a claimant. The speaker verification system contains a memory, a pattern classification circuitry, and a decision logic circuitry. The memory stores a plurality of speaker models, a plurality of speaker thresholds, and a plurality of cohort model identification variables. The memory also stores a male cohort model that is generated using a plurality of speech utterances of a plurality of male speakers, a female cohort model that is generated using a plurality of speech utterances of a plurality of female speakers, and a general cohort model that is generated using a plurality of speech utterances of a plurality of female and male speakers. The pattern classification circuitry processes the speech utterance provided by the claimant. The speech utterance is scored against a selected one of the male cohort model, the female cohort model, the general cohort model, and the speaker model. The pattern classification circuitry operates using an unsupervised classifier. The decision logic circuitry processes the speech utterance provided by the claimant to generate a relative score. The relative score is compared against a claimant speaker threshold that is selected from the plurality of speaker thresholds. The pattern classification circuitry and the decision logic circuitry operate cooperatively to generate a speaker authenticity.

In certain embodiments of the invention, the unsupervised classifier employs a simplified hidden Markov modeling (HMM) training method. If desired, the speaker verification system is operable at an arbitrary rate type including an equal error rate. In addition, the speech utterance provided by the claimant is of a substantially short duration. In other embodiments of the invention, a relative score is generated when the speech utterance is scored against the selected one of the male cohort model, the female cohort model, the general cohort model, and the speaker model, the relative score is compared to the claimant speaker threshold. Also, the speech utterance provided by the claimant is a predetermined verification phrase in certain embodiments of the invention. Pre-processing and feature extraction circuitry removes silence and extracts a plurality of cepstral features of the speech utterance provided by the claimant.

Other aspects of the invention can be found in a method that performs speaker verification by claiming an identity by recording a speech utterance, pre-processing and feature extracting the speech utterance, scoring the speech utterance against a speaker model and a cohort model, and determining an authenticity of the speech utterance. In certain embodiments of the invention, a relative score is generated during the scoring the speech utterance against a speaker model and a cohort model. In addition, pre-processing and feature extraction performed on the speech utterance also includes removing silence and extraction of a plurality of cepstral features of the speech utterance provided by the claimant. The method that performs speaker verification is operable wherein the speech utterance is of a substantially short duration and wherein the method is performed at an arbitrary rate type including an equal error rate.

Other aspects, advantages and novel features of the present invention will become apparent from the following detailed description of the invention when considered in conjunction with the accompanying drawings.

DETAILED DESCRIPTION OF DRAWINGS

Figure 1:
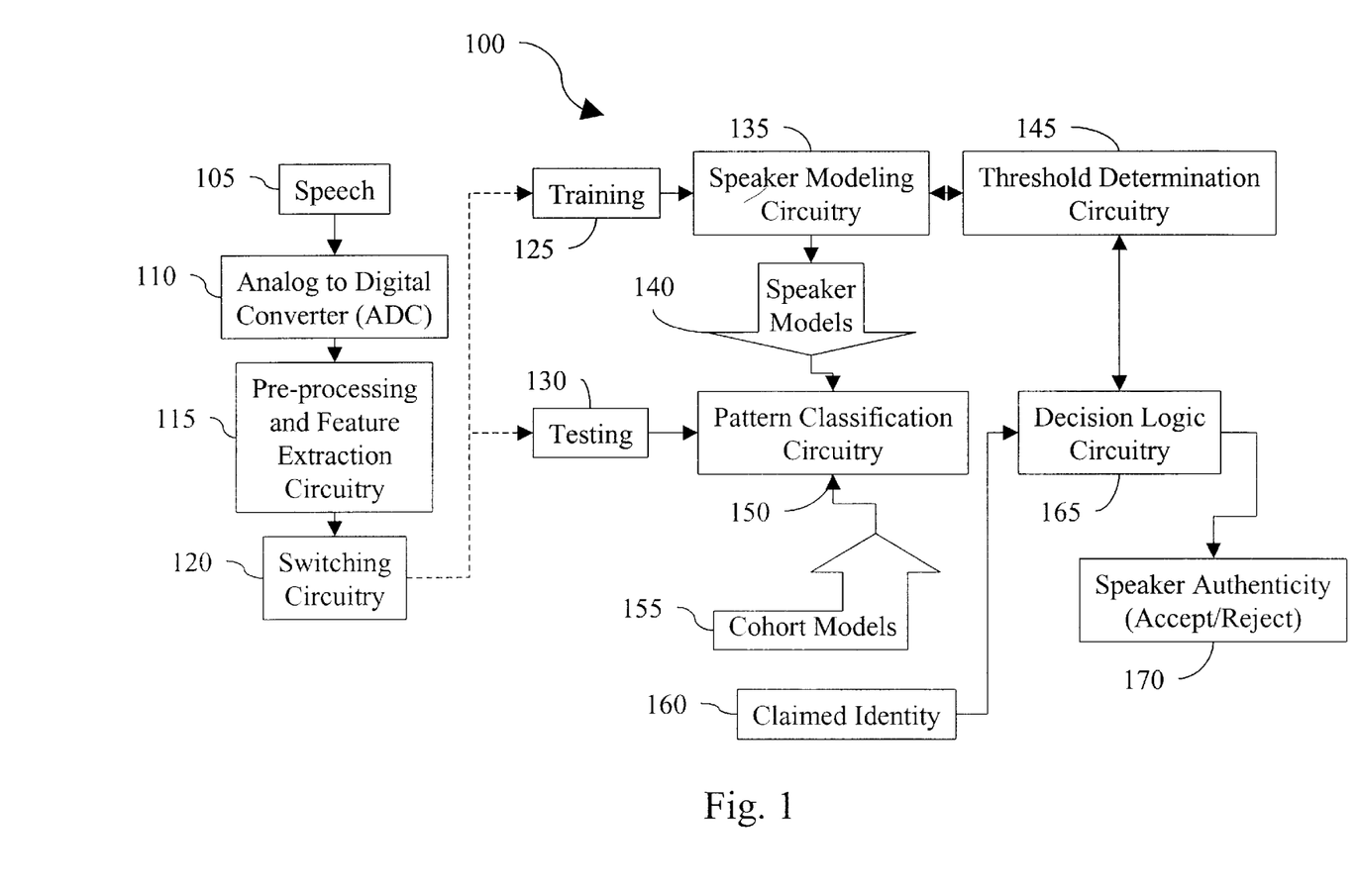
FIG. 1 is a system diagram illustrating the present invention that, in one embodiment, is an integrated speaker training and speaker verification system.

FIG. 1 is a system diagram illustrating the present invention that, in one embodiment, is an integrated speaker training and speaker verification system 100. The integrated speaker training and speaker verification system 100 is operable, in various embodiments of the invention, to perform either a training operation 125 or a testing operation 130, as desired in the specific application. The single integrated speaker training and speaker verification system 100 is operable to provide both the training operation 125 and the testing operation 130, thereby minimizing the total amount of circuitry and hardware required for an individual speaker training system and a speaker verification system. The integrated speaker training and speaker verification system 100 receives a speech signal 105 and provides it to an analog to digital converter (ADC) 110 so that the various circuitry of the integrated speaker training and speaker verification system 100 operates on the speech signal 105 in its now digital format. The speech signal 105, after being digitized using the analog to digital converter (ADC) 110, is passed to a pre-processing and feature extraction circuitry 115. Various pre-processing is performed in the pre-processing and feature extraction circuitry 115 in various embodiments of the invention, including but not limited to end-point detection, silence removal, and noise reduction. In addition, in other embodiments of the invention, the feature extraction performed by the pre-processing and feature extraction circuitry 115 utilizes parameterizing of the short time spectrum of the speech signal 105 to derive a compact set of representative parameters of the speech signal. Linear predictive coding (LPC) parameters and filter bank parameters are exemplary of one type of feature extraction performed by the pre-processing and feature extraction circuitry 115. Subsequently, in a switching circuitry 120, the integrated speaker training and speaker verification system 100 is operable to perform either the training operation 125 or the testing operation 130.

In those embodiments of the invention wherein the training operation 125 is performed by the integrated speaker training and speaker verification system 100, the speech signal 105, after having passed through the analog to digital converter (ADC) 110 and the pre-processing and feature extraction circuitry 115, is passed to a speaker modeling circuitry 135. The speaker modeling circuitry 135 generates a plurality of speaker models 140. In certain embodiments of the invention, the speaker modeling circuitry 135 generate the plurality of speaker models 140 using a simplified hidden Markov modeling (HMM) training method. The implementation of the simplified hidden Markov modeling (HMM) training method provides for very fast operation compared to traditional hidden Markov modeling (HMM) training methods. Moreover, in certain embodiments of the invention, the plurality of speaker models 140 contains at least one cohort model. In addition, the plurality of speaker models 140 contains a speaker model corresponding to a speaker who is authorized to use the integrated speaker training and speaker verification system 100. In certain embodiments of the invention, a threshold determination circuitry 145 is employed during the training operation 125 to calculate a speaker threshold corresponding to a speaker who is authorized to use the integrated speaker training and speaker verification system 100.

During the testing operation 130 of the integrated speaker training and speaker verification system 100, the speech signal 105, after having passed through the analog to digital converter (ADC) 110 and the pre-processing and feature extraction circuitry 115, is passed to a pattern classification circuitry 150. In certain embodiments of the invention, any unsupervised classification circuitry is employed within the pattern classification circuitry 150. In addition, when the speech signal 105 is provided, a claimed identity 160 is also provided to a decision logic circuitry 165 to perform the testing operation 130. In certain embodiments of the invention, the decision logic circuitry 165 uses a speaker threshold that is provided by the threshold determination circuitry 145 to perform the decision of whether to accept the claimed identity 160 as that of a speaker who is authorized to use the integrated speaker training and speaker verification system 100. The pattern classification circuitry 150 uses a plurality of cohort models 155 to perform the testing operation 130. In certain embodiments of the invention, the plurality of cohort models 155 are the plurality of speaker models 140 that are generated during operation of the training operation 125 of the integrated speaker training and speaker verification system 100. Using the plurality of cohort models 155, the pattern classification circuitry 150 operates on the speech signal 105 in conjunction with the decision logic circuitry to determine if the claimed identity 160 is in fact that of a speaker who is authorized to use the integrated speaker training and speaker verification system 100. A speaker authenticity (accept/reject) 170 is provided by the integrated speaker training and speaker verification system 100 during the testing operation 130. Depending on whether the claimed identity 160 is determined to be that of a speaker who is authorized to use the integrated speaker training and speaker verification system 100, the speaker authenticity (accept/reject) 170 will either accept or reject the claimed identity 160 as being that of a true or false claimant of the integrated speaker training and speaker verification system 100.

Figure 2:
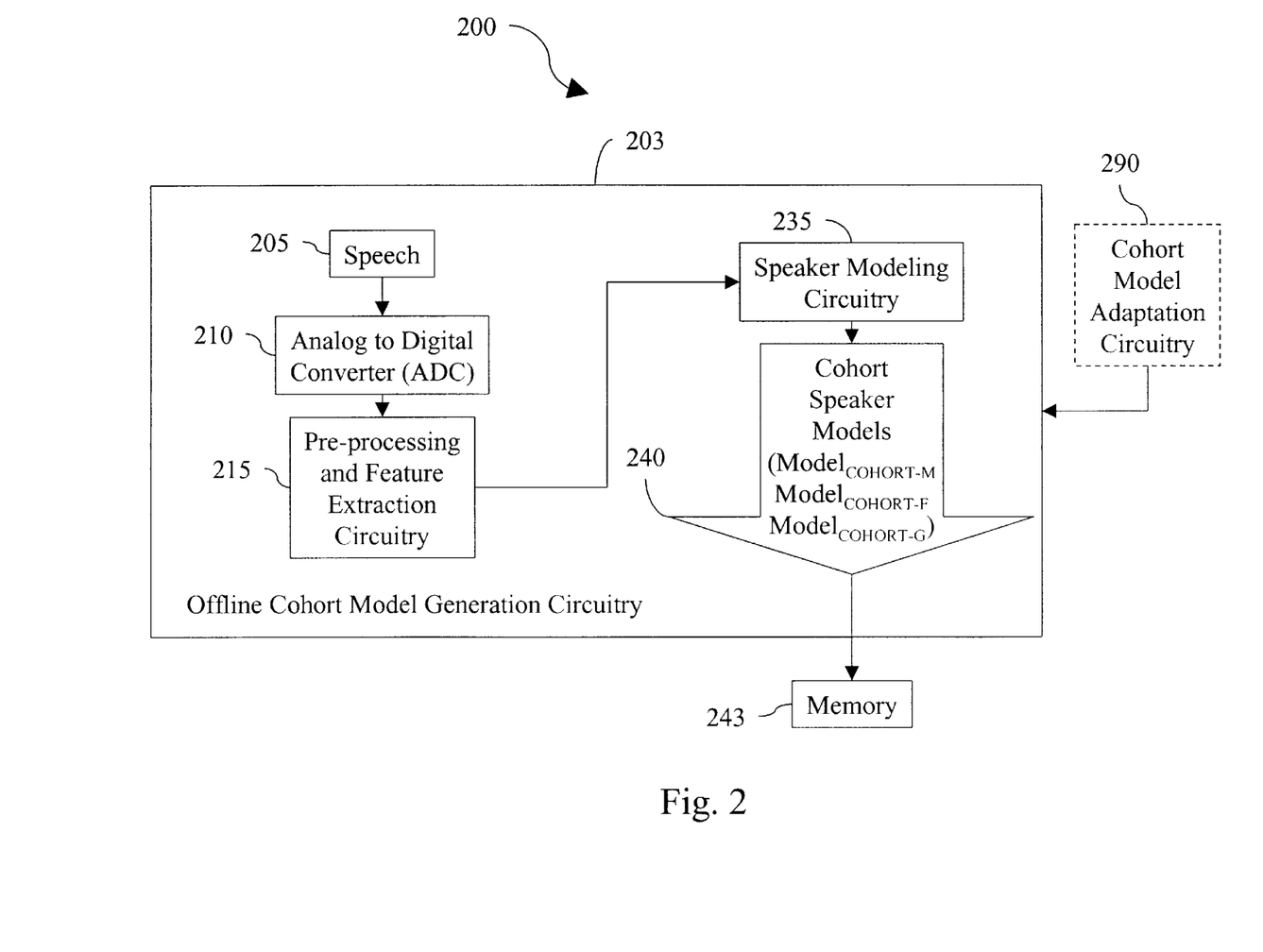
FIG. 2 is a system diagram illustrating one embodiment of the present invention that is a speaker model generating system that generates cohort models.

FIG. 2 is a system diagram illustrating one embodiment of the present invention that is a speaker model generating system 200 that generates a plurality of cohort models. The speaker model generating system 200 contains an offline cohort model generation circuitry 203, and, in certain embodiments of the invention, a cohort model adaptation circuitry 290. The speaker model generating system 200 receives a speech signal 205 and passes it to an analog to digital converter (ADC) 210 where the speech signal 205 is digitized for operation using the various circuitry of the speaker model generating system 200. After the speech signal 205 is passed through the analog to digital converter (ADC) 210, it is fed to a pre-processing and feature extraction circuitry 215. Similar to the pre-processing and feature extraction circuitry 115 of FIG. 1, the pre-processing and feature extraction circuitry 215 of FIG. 2 performs various pre-processing in various embodiments of the invention, including but not limited to end-point detection, silence removal, and noise reduction. In addition, in other embodiments of the invention, the feature extraction performed by the pre-processing and feature extraction circuitry 215 utilizes parameterizing of the short time spectrum of the speech signal 205 to derive a compact set of representative parameters of the speech signal. Linear predictive coding (LPC) parameters and filter bank parameters are exemplary of one type of feature extraction performed by the pre-processing and feature extraction circuitry 215. Subsequently, the speech signal 205, after having passed through the analog to digital converter (ADC) 210 and the pre-processing and feature extraction circuitry 215, is fed to a speaker modeling circuitry 235.

The speaker modeling circuitry 235 generates a plurality of cohort models ($Model_{COHORT-M}$, $Model_{COHORT-F}$, and $Model_{COHORT-G}$) 240. One cohort model is generated using the speech signal 205 provided by a certain number of male speakers ($Model_{COHORT-M}$); another cohort model is generated using the speech signal 205 provided by a certain number of female speakers ($\text{Model}_{COHORT-F}$); a third and general cohort model is generated using the speech signal 205 provided by a certain number of speakers of both genders, male and female, ($\text{Model}_{COHORT-G}$). The plurality of cohort models ($\text{Model}_{COHORT-M}$, $\text{Model}_{COHORT-F}$, and $\text{Model}_{COHORT-G}$) 240 are stored in a memory 243. The memory 243 is any type of memory including random access memory (RAM), read only memory (ROM), static random access memory (SRAM), or any other type of memory that is capable of storing the plurality of cohort models ($\text{Model}_{COHORT-M}$, $\text{Model}_{COHORT-F}$, and $\text{Model}_{COHORT-G}$) 240. In certain embodiments of the invention, a predetermined number of utterances are provided for the generation of the plurality of cohort models ($\text{Model}_{COHORT-M}$, $\text{Model}_{COHORT-F}$, and $\text{Model}_{COHORT-G}$) 240. For example, twenty speakers of each gender are used to provide four utterances of a verification phrase for the speech signal 205 in certain embodiments of the invention. Any variations of numbers of individual speakers and variations of numbers of utterances of a verification phrase are used in other embodiments of the invention. Certain applications are limited in the total number speakers and number of utterances that provide the verification phrase for the speech signal 205, among other reasons, for the limitations of the memory 243 within the system. In certain embodiments of the invention, as new speakers are added to the speaker model generating system 200 over time, the cohort model adaptation circuitry 290 provides for the updating of the plurality of cohort models ($\text{Model}_{COHORT-M}$, $\text{Model}_{COHORT-F}$, and $\text{Model}_{COHORT-G}$) 240 using utterances of the verification phrase of the speech signal 205 by the new speakers. The cohort model adaptation circuitry 290 provides for the option of accommodating growing numbers of speakers that use the speaker model generating system 200. Similarly, as some speakers discontinue to use the speaker model generating system 200 over time, the cohort model adaptation circuitry 290 provides the ability to modify the plurality of cohort models ($\text{Model}_{COHORT-M}$, $\text{Model}_{COHORT-F}$, and $\text{Model}_{COHORT-G}$) 240 so that the individual cohort models of the plurality of cohort models ($\text{Model}_{COHORT-M}$, $\text{Model}_{COHORT-F}$, and $\text{Model}_{COHORT-G}$) 240 are more appropriately representative of the actual users of the speaker model generating system 200.

Figure 3:
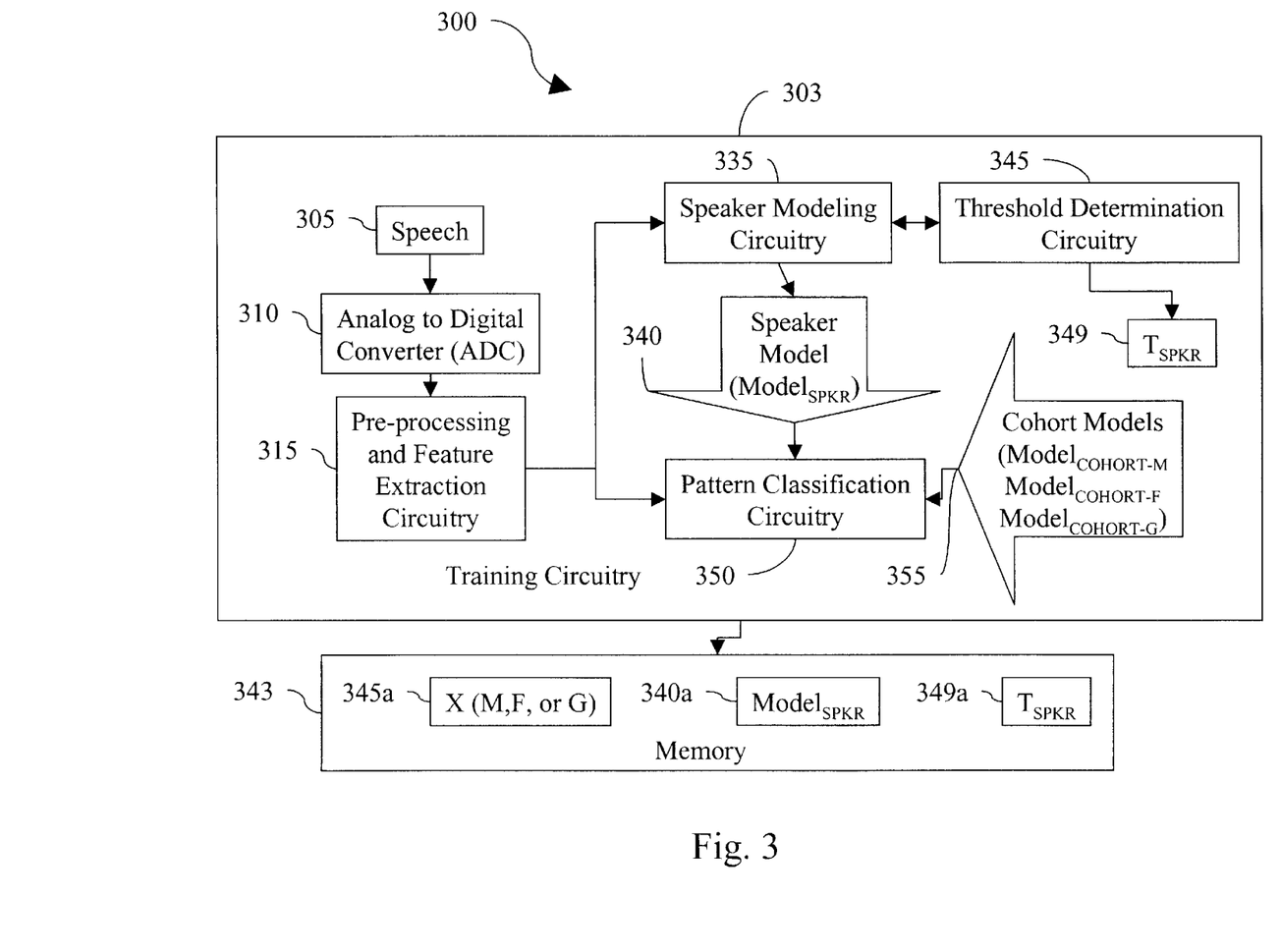
FIG. 3 is a system diagram illustrating one embodiment of the present invention that is a speaker training system that selects a cohort model as well as generates a speaker model and a speaker threshold all corresponding to a speaker.

FIG. 3 is a system diagram illustrating one embodiment of the present invention that is a speaker training system 300 that selects a cohort model as well as generates a speaker model and a speaker threshold all corresponding to a speaker. In certain embodiments of the invention, the speaker training system 300 is viewed as performing the training operation 125 of the integrated speaker training and speaker verification system 100 of FIG. 1. Alternatively, the speaker training system 300 is operable in a stand alone mode wherein no speaker testing is performed in other embodiments of the invention.

The speaker training system 300 contains, among other things, a training circuitry 303 and a memory 343 into which various parameters generated during the training process by the training circuitry 303 are stored. Within the training circuitry 303 itself, a speech signal 305 is received and it is passed to an analog to digital converter (ADC) 310 where the speech signal 305 is digitized for operation using the various circuitry of the speaker training system 300. After the speech signal 305 is passed through the analog to digital converter (ADC) 310, it is fed to a pre-processing and feature extraction circuitry 315. Similar to the pre-processing and feature extraction circuitry 115 of FIG. 1 and the pre-processing and feature extraction circuitry 215 of FIG. 2, the pre-processing and feature extraction circuitry 315 of FIG. 3 performs various pre-processing in various embodiments of the invention, including but not limited to end-point detection, silence removal, and noise reduction. In addition, in other embodiments of the invention, the feature extraction performed by the pre-processing and feature extraction circuitry 315 utilizes parameterizing of the short time spectrum of the speech signal 305 to derive a compact set of representative parameters of the speech signal. Linear predictive coding (LPC) parameters and filter bank parameters are exemplary of one type of feature extraction performed by the pre-processing and feature extraction circuitry 315. Subsequently, the speech signal 305, after having passed through the analog to digital converter (ADC) 310 and the pre-processing and feature extraction circuitry 315, is fed to a speaker modeling circuitry 335.

The speaker modeling circuitry 335 uses the speech signal 305 to generate a speaker model ($\text{Model}_{SPKR}$) 340 corresponding to the utterance or speech signal 305 provided by an individual who is training the speaker training system 300. In addition, using the speech signal 305, the speaker training system 300 employs a threshold determination circuitry 345 to determine a speaker threshold ($t_{SPKR}$) 349 corresponding to the utterance or speech signal 305 provided by the individual who is training the speaker training system 300. For every individual who trains the speaker training system 300, the speaker model ($\text{Model}_{SPKR}$) 340 and the speaker threshold ($t_{SPKR}$) 349. One specific embodiment of the invention that calculates the speaker model ($\text{Model}_{SPKR}$) 340 and the speaker threshold ($t_{SPKR}$) 349 is described below in the detailed description of FIG. 6. Other embodiments of the invention are employed to calculate the speaker model ($\text{Model}_{SPKR}$) 340 and the speaker threshold ($T_{SPKR}$) 349 without departing from the scope and spirit of the invention. Subsequently, the extracted features from the speech signal 305, as provided by the pre-processing and feature extraction circuitry 315, are fed into a pattern classification circuitry 350 where they are scored against a plurality of cohort models ($\text{Model}_{COHORT-M}$, $\text{Model}_{COHORT-F}$, and $\text{Model}_{COHORT-G}$) 355. In certain embodiments of the invention, the plurality of cohort models ($\text{Model}_{COHORT-M}$, $\text{Model}_{COHORT-F}$, and $\text{Model}_{COHORT-G}$) 355 is precisely the plurality of cohort models ($\text{Model}_{COHORT-M}$, $\text{Model}_{COHORT-F}$, and $\text{Model}_{COHORT-G}$) 240 of FIG. 2. In other embodiments of the invention, the plurality of cohort models ($\text{Model}_{COHORT-M}$, $\text{Model}_{COHORT-F}$, and $\text{Model}_{COHORT-G}$) 355 is independent of the plurality of cohort models ($\text{Model}_{COHORT-M}$, $\text{Model}_{COHORT-F}$, and $\text{Model}_{COHORT-G}$) 240 of FIG. 2 in terms of the number of individuals and utterances from each individual that are used to generate the plurality of cohort models ($\text{Model}_{COHORT-M}$, $\text{Model}_{COHORT-F}$, and $\text{Model}_{COHORT-G}$) 355. Nevertheless, the plurality of cohort models ($\text{Model}_{COHORT-M}$, $\text{Model}_{COHORT-F}$, and $\text{Model}_{COHORT-G}$) 355 are compared to the speaker model ($\text{Model}_{SPKR}$) 340 to determine which specific cohort model within the plurality of cohort models ($\text{Model}_{COHORT-M}$, $\text{Model}_{COHORT-F}$, and $\text{Model}_{COHORT-G}$) 355 is a most closely associated with the speaker model ($\text{Model}_{SPKR}$) 340 using the pattern classification circuitry 350.

Once the pattern classification circuitry 350 has determined which of the plurality of cohort models ($\text{Model}_{COHORT-M}$, $\text{Model}_{COHORT-F}$, and $\text{Model}_{COHORT-G}$) 355 is a most closely associated with the speaker model ($\text{Model}_{SPKR}$) 340, it stores a cohort model identification variable X (M, F, or G) 345a in the memory 343. The cohort model identification variable X (M, F, or G) 345a corresponds to the one of the plurality of cohort models ($Model_{COHORT\text{-}M}$, $Model_{COHORT\text{-}F}$, and $Model_{COHORT\text{-}G}$) 355 that is most closely associated with the speaker model ($Model_{SPKR}$) 340. The plurality of cohort models ($Model_{COHORT\text{-}M}$, $Model_{COHORT\text{-}F}$, and $Model_{COHORT\text{-}G}$) 355 is already stored in a memory, and the cohort model identification variable X (M, F, or G) 345a provides that the specific cohort model, corresponding to the one selected that is most closely associated with the speaker model ($Model_{SPKR}$) 340 for the speaker, is easily extracted and subsequently used during speaker recognition performed in accordance with the invention. Stored within the memory 343 of the speaker training system 300 are the cohort model identification variable X (M, F, or G) 345a, a speaker model ($Model_{SPKR}$) 340a corresponding to the speaker model ($Model_{SPKR}$) 340, and a speaker threshold ($T_{SPKR}$) 349a corresponding to the speaker threshold ($T_{SPKR}$) 349.

Figure 4:
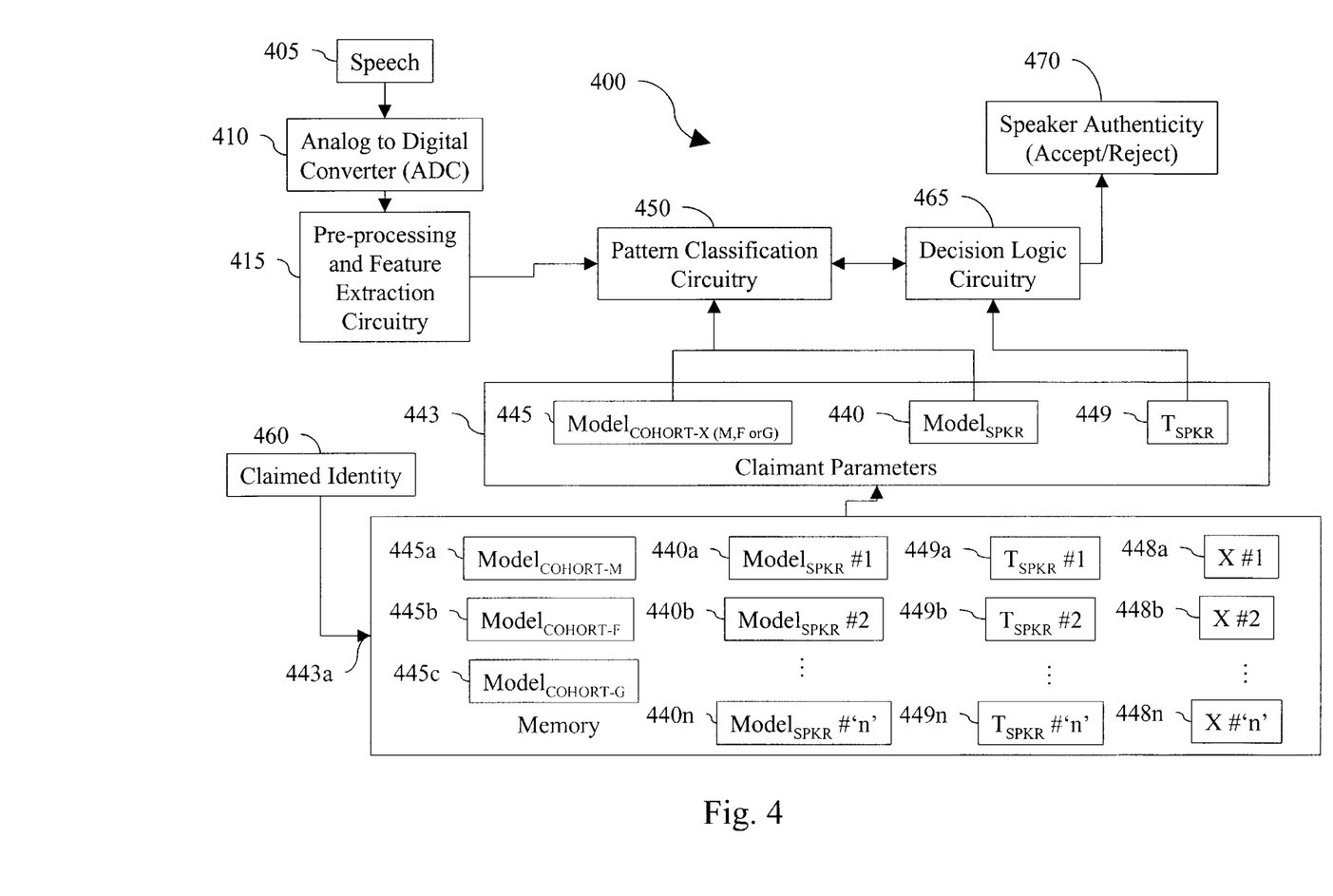
FIG. 4 is a system diagram illustrating one embodiment of the present invention that is a speaker verification system.

FIG. 4 is a system diagram illustrating one embodiment of the present invention that is a speaker verification system 400. In certain embodiments of the invention, the speaker verification system 400 is viewed as performing the testing operation 100 of the integrated speaker training and speaker verification system 130 of FIG. 1. Alternatively, the speaker verification system 400 is operable in a stand alone mode wherein no speaker training is performed in other embodiments of the invention.

Within the speaker verification system 400 itself, a speech signal 405 is received and it is passed to an analog to digital converter (ADC) 410 where the speech signal 405 is digitized for operation using the various circuitry of the speaker verification system 400. After the speech signal 405 is passed through the analog to digital converter (ADC) 410, it is fed to a pre-processing and feature extraction circuitry 415. Similar to the pre-processing and feature extraction circuitry 115 of FIG. 1, the pre-processing and feature extraction circuitry 215 of FIG. 2, and the pre-processing and feature extraction circuitry 315 of FIG. 3, the pre-processing and feature extraction circuitry 415 of FIG. 4 performs various pre-processing in various embodiments of the invention, including but not limited to end-point detection, silence removal, and noise reduction. In addition, in other embodiments of the invention, the feature extraction performed by the pre-processing and feature extraction circuitry 415 utilizes parameterizing of the short time spectrum of the speech signal 405 to derive a compact set of representative parameters of the speech signal. Linear predictive coding (LPC) parameters and filter bank parameters are exemplary of one type of feature extraction performed by the pre-processing and feature extraction circuitry 415. Subsequently, the speech signal 405, after having passed through the analog to digital converter (ADC) 410 and the pre-processing and feature extraction circuitry 415, is fed to a pattern classification circuitry 450. The pattern classification circuitry 450 cooperates with a decision logic circuitry 465 to determine whether the speech signal 405 is that of an individual authorized to gain access through the speaker verification system 400. In addition, when the speech signal 405 is provided to the speaker verification system 400, a claimed identity 460 is also associated with the speech signal 405. Ultimately, the speaker verification system 400 determines a speaker authenticity (accept/reject) 470. The speaker authenticity (accept/reject) 470 controls whether to accept or reject a claimed identity 460 as being that which is associated with the speech signal 405, namely, whether the speech signal 405 is that of an authorized user of the system who is entitled gain access through the speaker verification system 400.

When the claimed identity 460 is provided to the speaker verification system 400, the claimed identity 460 is provided to a memory 443a where the claimed identity 460 prompts the extraction of a plurality of claimant parameters 443 from the memory 443a.

A plurality of cohort models is stored in the memory 443a, including a cohort model ($Model_{COHORT\text{-}M}$) 445a, a cohort model ($Model_{COHORT\text{-}F}$) 445b, and a cohort model ($Model_{COHORT\text{-}G}$) 445c. In certain embodiments of the invention, the plurality of cohort models including the cohort model ($Model_{COHORT\text{-}M}$) 445a, the cohort model ($Model_{COHORT\text{-}F}$) 445b, and the cohort model ($Model_{COHORT\text{-}G}$) 445c is the plurality of cohort models ($Model_{COHORT\text{-}M}$, $Model_{COHORT\text{-}F}$, and $Model_{COHORT\text{-}G}$) 240 of FIG. 2; alternatively, the plurality of cohort models including the cohort model ($Model_{COHORT\text{-}M}$) 445a, the cohort model ($Model_{COHORT\text{-}F}$) 445b, and the cohort model ($Model_{COHORT\text{-}G}$) 445c is the plurality of cohort models ($Model_{COHORT\text{-}M}$, $Model_{COHORT\text{-}F}$, and $Model_{COHORT\text{-}G}$) 355 of FIG. 3 in other embodiments of the invention. In addition, each of the speakers who are authorized users of the system who are entitled gain access through the speaker verification system 400 has his individual plurality of claimant parameters 443 within the memory 443a. The claimed identity 460 selects the plurality of claimant parameters 443 from the memory 443a, wherein the plurality of claimant parameters 443 contains a cohort model ($Model_{COHORT\text{-}X\,(M, F,\,or\,G)}$) 445, a speaker model ($Model_{SPKR}$) 440, and a speaker threshold ($T_{SPKR}$) 449 The cohort model ($Model_{X\,(M,\,F,\,or\,G)}$) 445 is selected from among the cohort model ($Model_{COHORT\text{-}M}$) 445a, the cohort model ($Model_{COHORT\text{-}F}$) 445b, and the cohort model ($Model_{COHORT\text{-}G}$) 445c and the claimed identity itself determines which of the cohort models is selected. In certain embodiments of the invention, the claimed identity contains the cohort model identification variable X (M, F, or G) 345a, similar to that of the embodiment of the invention described in FIG. 3, so that the proper cohort model is extracted from the memory 443a. The cohort model ($Model_{COHORT\text{-}X\,(M,\,F,\,or\,G)}$) 445 is selected from among the cohort model ($Model_{COHORT\text{-}M}$) 445a, the cohort model ($Model_{COHORT\text{-}F}$) 445b, and the cohort model ($Model_{COHORT\text{-}G}$) 445c using a cohort model identification variable that is associated with the claimed identity 460. That particular cohort model identification variable, corresponding to the claimed identity 460, is selected from among a plurality of cohort model identification variables having a predetermined number 'n' of cohort model identification variables. The predetermined number 'n' corresponds to the speakers who are authorized users of the system who are entitled gain access through the speaker verification system 400. The number of speakers who are authorized users of the system who are entitled gain access through the speaker verification system 400 is modified over time in various embodiments of the invention. The plurality of cohort model identification variables is illustrated in the memory 443a of FIG. 4 as a cohort model identification variable (X#1) 448a, a cohort model identification variable (X#2) 448b, and a cohort model identification variable (X#'n') 448n.

The speaker model ($Model_{SPKR}$) 440 is selected from among a plurality of speaker models having a predetermined number 'n' of speaker models. The predetermined number 'n' corresponds to the speakers who are authorized users of the system who are entitled gain access through the speaker verification system 400. The number of speakers who are authorized users of the system who are entitled gain access through the speaker verification system 400 is modified over time in various embodiments of the invention. The plurality of speaker models is illustrated in the memory 443a of FIG. 4 as a speaker model ($Model_{SPKR}$#1) 440a, a speaker model ($Model_{SPKR}$#2) 440b, and a speaker model ($Model_{SPKR}$#'n') 440n.

The speaker threshold ($T_{SPKR}$) 449 is selected from among a plurality of speaker thresholds having a predetermined number 'n' of speaker thresholds. Again, the predetermined number 'n' corresponds to the speakers who are authorized users of the system who are entitled gain access through the speaker verification system 400. The number of speakers who are authorized users of the system who are entitled gain access through the speaker verification system 400 is modified over time in various embodiments of the invention. The plurality of speaker thresholds is illustrated in the memory 443a of FIG. 4 as a speaker threshold ($T_{SPKR}\#1$) 449a, a speaker threshold ($T_{SPKR}\#2$) 449b, and a speaker threshold ($T_{SPKR}\#\text{n'}$) 449n.

Once the plurality of claimant parameters 443 are selected, the cohort model ($\text{Model}_{COHORT-X\ (M,\ F,\ or\ G)}$) 445 and the speaker model ($\text{Model}_{SPKR}$) 440 are fed to the pattern classification circuitry 450. The speaker threshold ($T_{SPKR}$) 449 is fed to the decision logic circuitry 465. As mentioned above, the pattern classification circuitry 450 and the decision logic circuitry 465 cooperate to determine the speaker authenticity (accept/reject) 470. One specific embodiment of the invention that determines the speaker authenticity (accept/reject) 470 is described below in the detailed description of FIG. 7. Other embodiments of the invention are employed to determine the speaker authenticity (accept/reject) 470 without departing from the scope and spirit of the invention.

Figure 5:
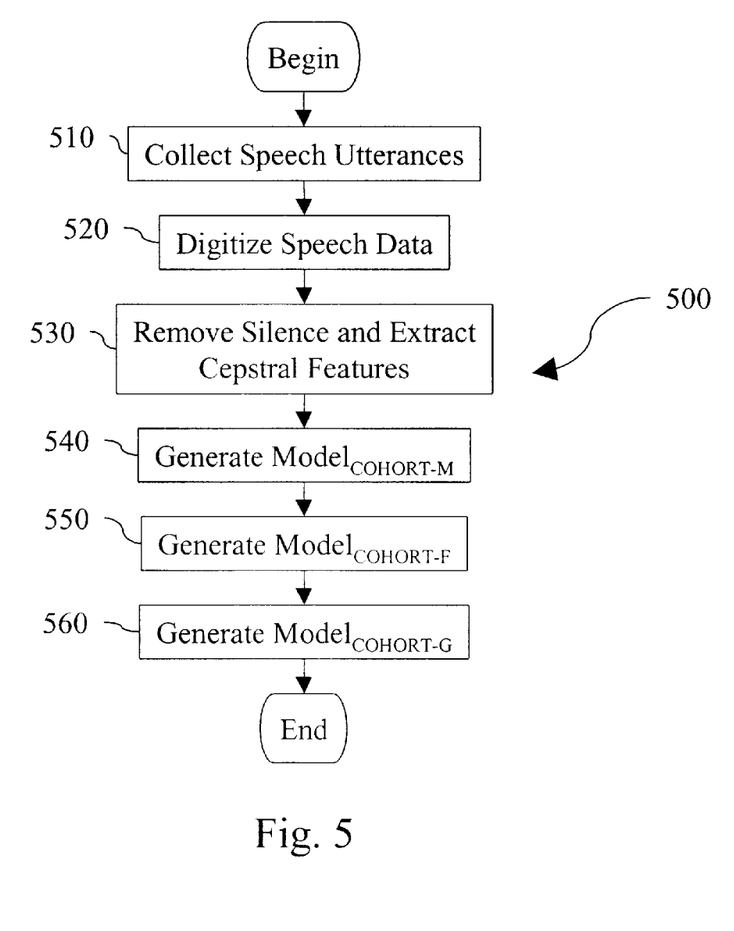
FIG. 5 is a functional block diagram illustrating a method performed in accordance with the invention that generates cohort models.

FIG. 5 is a functional block diagram illustrating a method 500 performed in accordance with the invention that generates cohort models. In a block 510, a number or speech utterances are collected. In a block 520, the speech utterances are digitized. In a block 530, silence is removed from the speech utterances and cepstral features are extracted from the speech utterances. In a block 540, a cohort model is generated using speech utterances provided by a certain number of male speakers ($\text{Model}_{COHORT-M}$). In a block 550, a cohort model is generated using speech utterances provided by a certain number of female speakers ($\text{Model}_{COHORT-F}$). In a block 560, a general cohort model is generated using speech utterances provided by a certain number of speakers of both genders, male and female, ($\text{Model}_{COHORT-G}$), in certain embodiments of the invention, twenty speakers of each gender are used to provide four utterances in the performance of block 510. Any variations of numbers of individual speakers and variations of numbers of utterances of a verification phrase are used in other embodiments of the invention, as described above in the detailed description of the speaker model generating system 200 of FIG. 2.

Figure 6:
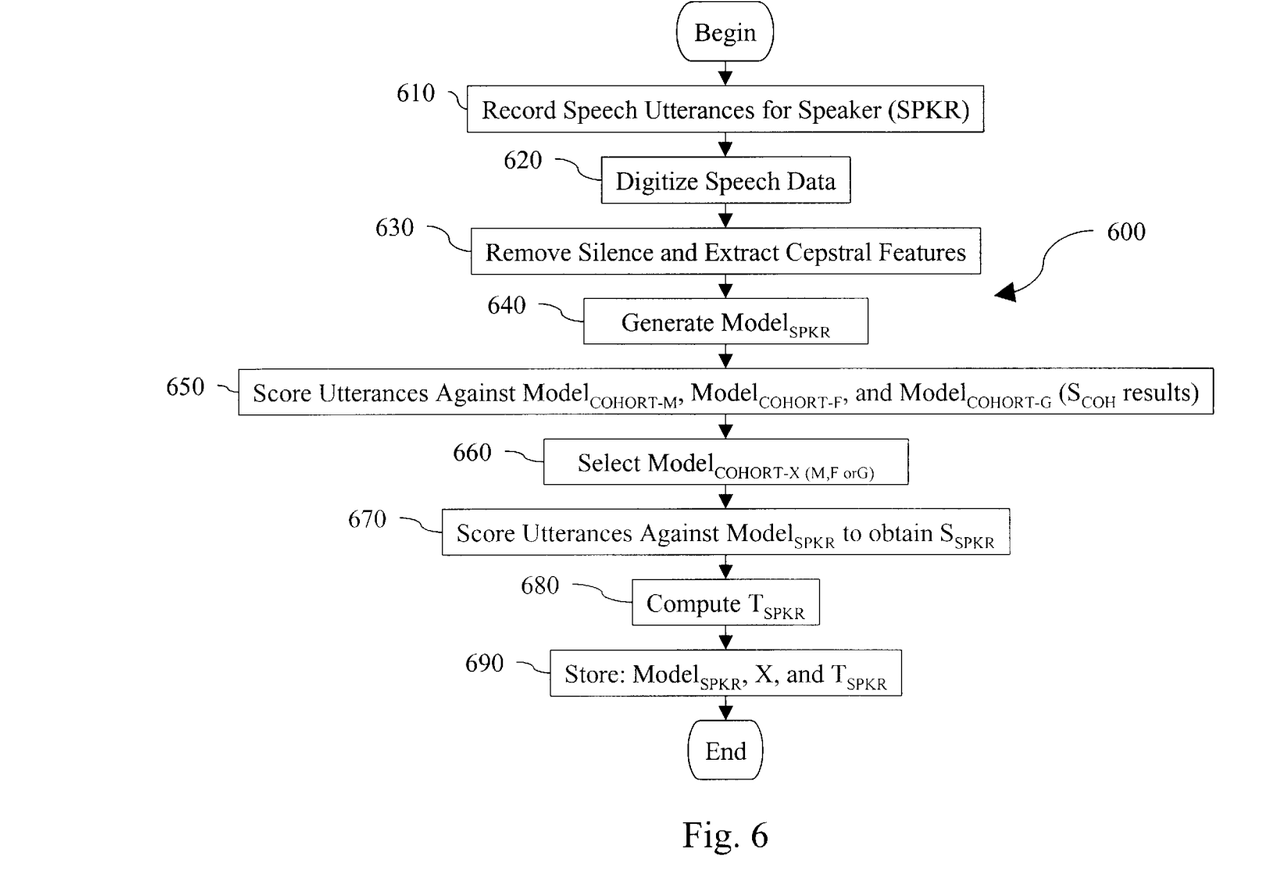
FIG. 6 is a functional block diagram illustrating a method performed in accordance with the invention that trains a speaker recognition system.

FIG. 6 is a functional block diagram illustrating a method 600 performed in accordance with the invention that trains a speaker recognition system. In a block 610, a predetermined number of speech utterances are recorded for a speaker (SPKR). In a block 620, those speech utterances corresponding to the speaker (SPKR) are digitized. In a block 630, silence is removed from the speech utterances and cepstral features are extracted from the speech utterances. In a block 640, a speaker model is generated using the predetermined number of speech utterances provided by the speaker (SPKR) ($\text{Model}_{SPKR}$). In a block 650, the predetermined number of speech utterances corresponding to the speaker (SPKR) are scored against the various cohort models described above in various embodiments of the invention ($\text{Model}_{COHORT-M}$, $\text{Model}_{COHORT-F}$, and $\text{Model}_{COHORT-G}$). A score ($S_{COH}$) for the individual speaker (SPKR) results after this scoring of the block 650 is performed.

A matrix of scores is generated from this scoring performed in the block 650 as follows:

This will result in a matrix of scores such as $$S_{COH} = \begin{Vmatrix} S_{1,M} & S_{1,F} & S_{1,G} \\ S_{2,M} & S_{2,F} & S_{2,G} \\ S_{3,M} & S_{3,F} & S_{3,G} \\ S_{4,M} & S_{4,F} & S_{4,G} \end{Vmatrix}$$

Subsequently, in a block 660, a cohort model is selected that corresponds to the speaker. The cohort model is one of the various cohort models described above in various embodiments of the invention ($\text{Model}_{COHORT-M}$, $\text{Model}_{COHORT-F}$, and $\text{Model}_{COHORT-G}$). Only an identification variable 'X' need be stored in a memory in accordance with the method 600, as the identification variable 'X' will indicate which of the cohort models is appropriate in the given case. For every speaker who trains the speaker recognition system, one of the three cohort models is selected and associated with that speaker ($\text{Model}_{COHORT-X\ (M,F,\ or\ G)}$). In a block 670, the speech utterances of the speaker (SPKR) are scored against the speaker model ($\text{Model}_{SPKR}$) that is generated in the block 640 to obtain a vector of scores for the speaker ($S_{SPKR}$).

Score each of the utterances against $\text{Model}_{SPKR}$ to obtain a vector of scores, $$S_{SPKR} = \begin{Vmatrix} S_{1,SPKR} \\ S_{2,SPKR} \\ S_{3,SPKR} \\ S_{4,SPKR} \end{Vmatrix}$$

Compute The Speaker's Threshold $$T_{SPKR} = \frac{\alpha}{4} \sum_{i=1}^{4} \frac{S_{i,SPKR} - S_{i,X}}{S_{i,SPKR}},$$

where $\alpha$ is a parameter that determines the error type.

Subsequently, a speaker threshold ($T_{SPKR}$) is calculated in a block 680. After the speaker model ($\text{Model}_{SPKR}$) is generated in the block 640, the cohort model that is most closely associated with the speech utterances of the speaker is selected in the block 660 ($\text{Model}_{COHORT-X\ (M,F,\ or\ G)}$), and the speaker threshold is calculated ($T_{SPKR}$) is calculated in the block 680, all three of the variables are stored in a memory in a block 690. Since the cohort models ($\text{Model}_{COHORT-M}$, $\text{Model}_{COHORT-F}$, and $\text{Model}_{COHORT-G}$) are already stored in a memory, only the identification variable 'X' need be stored to represent the proper cohort model corresponding to the speech utterances of the speaker.

There are two types of errors that can occur in speaker verification systems, namely, a False Rejection (FR) and a False Acceptance (FA) error. False Rejection (FR) error occurs when an authorized user of the speaker recognition system, claiming to be himself, is rejected and not allowed to enter through the speaker recognition system. False Acceptance (FA) error occurs when an imposter is accepted as an authorized user of the speaker recognition system. Typically, the False Acceptance (FA) error and the False Rejection (FR) error are adjustable wherein one is improved at the expense of the other. The False Acceptance (FA) error and the False Rejection (FR) error are set according to the specific application of the invention. Another error rate at which the speaker recognition system's is measured is a measurand that is derivative of both the False Acceptance (FA) error and the False Rejection (FR) error. This other error rate is commonly referred to as an Equal Error Rate (EER) wherein the False Acceptance (FA) error and the False Rejection (FR) error are equal. In certain embodiments of the invention, experimental evidence has provided empirical support showing that setting α to 0.33 results in near Equal Error Rate (EER) operation mode. As described above, Equal Error Rate (EER) is a term of art well known to those having skill in the art of speaker recognition and speaker verification. Greater values of α results in higher False Rejection (FR) error while smaller value of α results in higher False Acceptance (FA) error. False Rejection (FR) error and False Acceptance (FA) error are inherently provided at the cost of one another. For example, to provide for a smaller False Acceptance (FA) error will directly come at the cost of a higher False Rejection (FR) error. Similarly, to provide for a smaller False Rejection (FR) error will directly come at the cost of a higher False Acceptance (FA) error, as described above.

Figure 7:
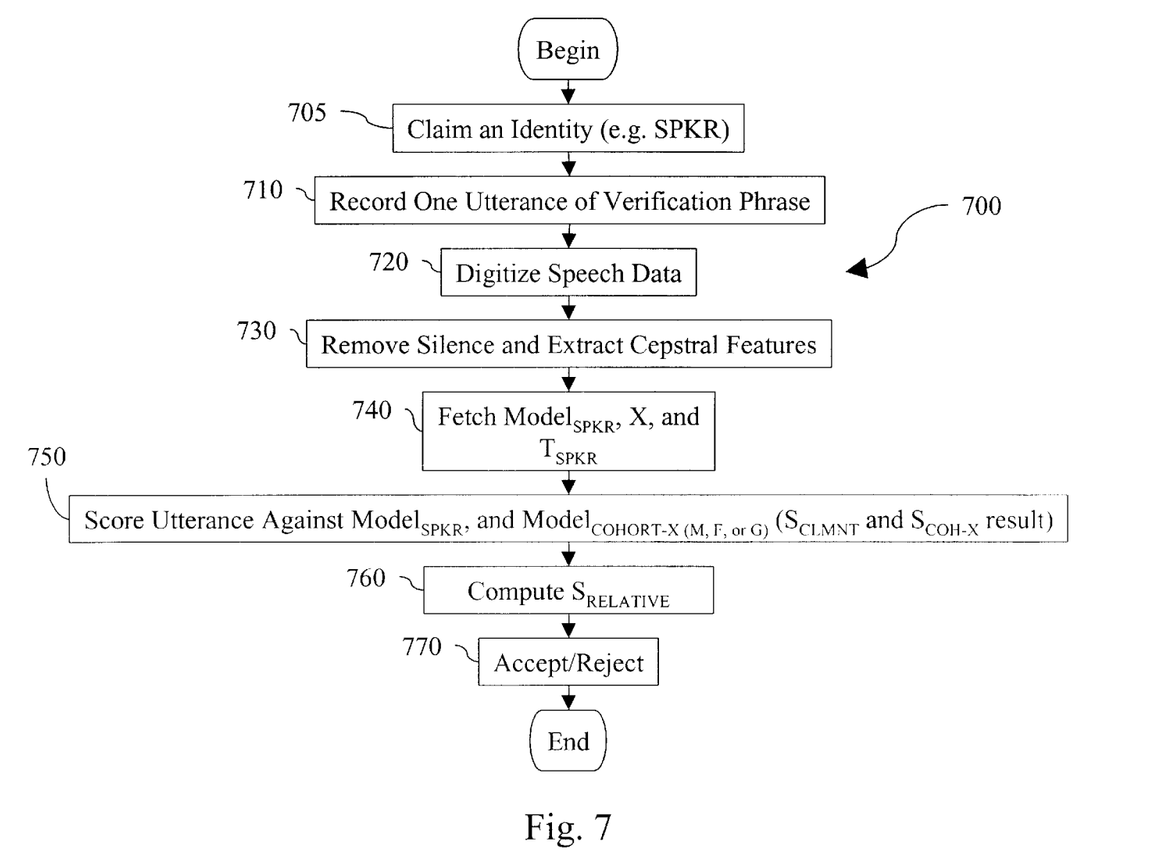
FIG. 7 is a functional block diagram illustrating a method performed in accordance with the invention that verifies whether a claimant is an authorized user of a speaker recognition system.

FIG. 7 is a functional block diagram illustrating a method 700 performed in accordance with the invention that verifies whether a claimant is an authorized user of a speaker recognition system. In a block 705, a claimant claims an identity (e.g. SPKR). If desired, the identity that is claimed is that of a predetermined verification phrase. Then, in a block 710, the claimant records one speech utterance of a predetermined verification phrase. In other embodiments of the invention, the claimant records one speech utterance of a predetermined verification word instead of a phrase. In a block 720, the one utterance of the block 710, whether it is a verification phrase or a verification word, is digitized. In a block 730, silence is removed from the speech utterances and cepstral features are extracted from the speech utterances. In a block 740, certain claimant parameters are fetched from a memory (Model$_{SPKR}$, X, and T$_{SPKR}$). In a block 750, the speech utterances that was recorded in the block 710 is scored against the speaker model (Model$_{SPKR}$) and the cohort model corresponding to the claimed identity of the claimant (Model$_{COHORT-X\ (M,F,\ or\ G)}$). Two absolute scores result when the speech utterance is scored against the (Model$_{SPKR}$) and the (Model$_{COHORT-X\ (M,F,\ or\ G)}$) in the block 750. The two absolute scores are one corresponding to the claimant (S$_{CLMNT}$) and the other corresponding to that result of the speech utterance result being scored against (Model$_{COHORT-X\ (M,F,\ or\ G)}$), namely, (S$_{COH-X}$). In a block 760, a relative score associated with the claimant is generated (S$_{RELATIVE}$).

Compute the relative score $$S_{RELATIVE} = \frac{S_{CLMNT} - S_{COH-X}}{S_{CLMNT}}$$

In a block 770, using the relative score generated in the block 760, and after comparing it to the speaker threshold (T$_{SPKR}$) that is fetched in the block 740, a decision is made whether to accept or reject the claimant's claim as being an authorized user of the speaker recognition system. That is to say, a decision is made in the block 770 whether to accept the claimant's claim in being a speaker that is an authorized user of the speaker recognition system using the relationship shown below.

If S$_{RELATIVE}$>T$_{SPKR}$ then ACCEPT CLMNT else REJECT CLMT.

As described above with respect to the method 600 of FIG. 6, a False Rejection (FR) error and a False Acceptance (FA) error are measurands in which the performance of the speaker recognition system is measured. For example, if, in the specific application of the method 700, a smaller False Rejection (FR) error is desired, it will come at the expense of a higher False Acceptance (FA) error. Similarly, a smaller False Rejection (FR) error will come at the expense of a higher False Acceptance (FA) error.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. An integrated speaker training and speaker verification system that generates a speaker model and a speaker authenticity using a speech utterance provided by a claimant, the integrated speaker training and speaker verification system comprising:

a training circuitry that generates the speaker model using the speech utterance and a speaker threshold provided by the claimant;

a memory that stores the speaker model and the speaker threshold corresponding to the speech utterance provided by the claimant, the memory also stores a plurality of universal cohort models;

a pattern classification circuitry that processes the speech utterance provided by the claimant, the speech utterance is scored against at least one of the plurality of universal cohort models and the speaker model;

a decision logic circuitry that processes the speech utterance provided by the claimant, the speech utterance is scored against the speaker threshold; and the pattern classification circuitry and the decision logic circuitry operate cooperatively to generate the speaker authenticity.

2. An integrated speaker training and speaker verification system that generates a speaker model and a speaker authenticity using a speech utterance provided by a claimant, the integrated speaker training and speaker verification system comprising:

a training circuitry that generates the speaker model using the speech utterance and a speaker threshold provided by the claimant;

a memory that stores the speaker model and the speaker threshold corresponding to the speech utterance provided by the claimant, the memory also stores a plurality of universal cohort models;

a pattern classification circuitry that processes the speech utterance provided by the claimant, the speech utterance is scored against at least one of the plurality of universal cohort models and the speaker model;

a decision logic circuitry that processes the speech utterance provided by the claimant, the speech utterance is scored against the speaker threshold;

the pattern classification circuitry and the decision logic circuitry operate cooperatively to generate the speaker authenticity;

an offline cohort model generation circuitry that generates at least two additional universal cohort models, in addition to the at least one universal cohort model;

at least one cohort models of the plurality of universal cohort model is generated using a speech utterance of a male speaker;

at least one cohort models of the plurality of universal cohort model is generated using a speech utterance of a female speaker; and at least one cohort models of the plurality of universal cohort model is generated using at least two speech utterances wherein one speech utterance of the at least two speech utterances is of a male speaker and one speech utterance of the at least two speech utterances is of a female speaker.

3. A speaker training and verification system that generates a speaker model and a speaker authenticity using a speech utterance provided by a claimant, the speaker training and verification system comprising:

a training circuitry that generates the speaker model using the speech utterance provided by the claimant;

a memory that stores the speaker model corresponding to the speech utterance provided by the claimant, the memory also stores a plurality of universal cohort models;

a pattern classification circuitry that processes the speech utterance provided by the claimant, the speech utterance is scored against at least one of the plurality of universal cohort models and the speaker model;

a decision logic circuitry that processes the speech utterance provided by the claimant, the speech utterance is scored against a speaker threshold; and wherein the pattern classification circuitry and the decision logic circuitry operate cooperatively to generate the speaker authenticity.

4. The speaker training and verification system of claim 3, further comprising an offline cohort model generation circuitry that generates at least two additional universal cohort models, in addition to the at least one universal cohort model;

at least one cohort models of the plurality of universal cohort model is generated using a speech utterance of a male speaker;

at least one cohort models of the plurality of universal cohort model is generated using a speech utterance of a female speaker; and at least one cohort models of the plurality of universal cohort model is generated using at least two speech utterances wherein one speech utterance of the at least two speech utterances is of a male speaker and one speech utterance of the at least two speech utterances is of a female speaker.

5. The speaker training,and verification system of claim 3, wherein the pattern classification circuitry is an unsupervised classifier.

6. The speaker training and verification system of claim 3, further comprising a switching circuitry that selects between a training operation and a testing operation.

7. The speaker training and verification system of claim 3 wherein the speech utterance provided by the claimant corresponds to a claimed identity.

8. The speaker training and verification system of claim 3 wherein the training circuitry further generates the speaker threshold using the speech utterance provided by the claimant, and the memory stores the speaker threshold corresponding to the speech utterance provided by the claimant.

9. A method to perform speaker verification, the method comprising:

receiving a speech utterance;

pre-processing the speech utterance to generate a pre-processed speech utterance;

extracting a plurality of features from the pre-processed speech utterance;

scoring the plurality of features of the pre-processed speech utterance against a speaker model and a universal cohort model; and determining an authenticity of the speech utterance based on the scoring.

10. The method of claim 9, wherein a relative score is generated during the scoring.

11. The method of claim 9, wherein the pre-processing removes silence and the extracting extracts a plurality of cepstral features.

12. The method of claim 9, wherein the method is performed at an arbitrary rate type, the arbitrary rate type comprises an equal error rate.

* * * * *